Oct. 16, 1923.
J. R. MAGINNESS
SCRAPER
Original Filed May 7, 1920    2 Sheets-Sheet 1
1,471,178
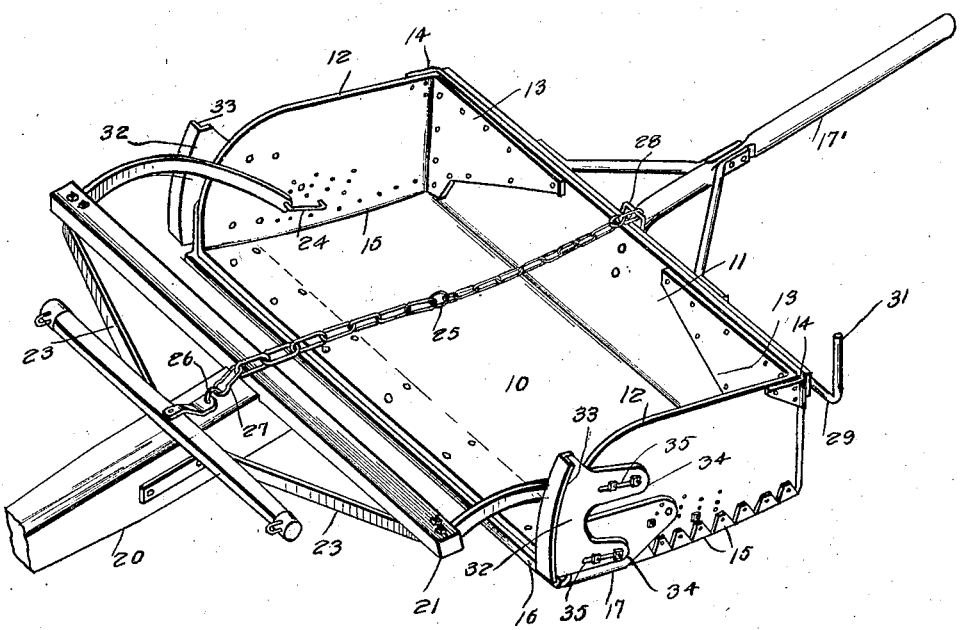
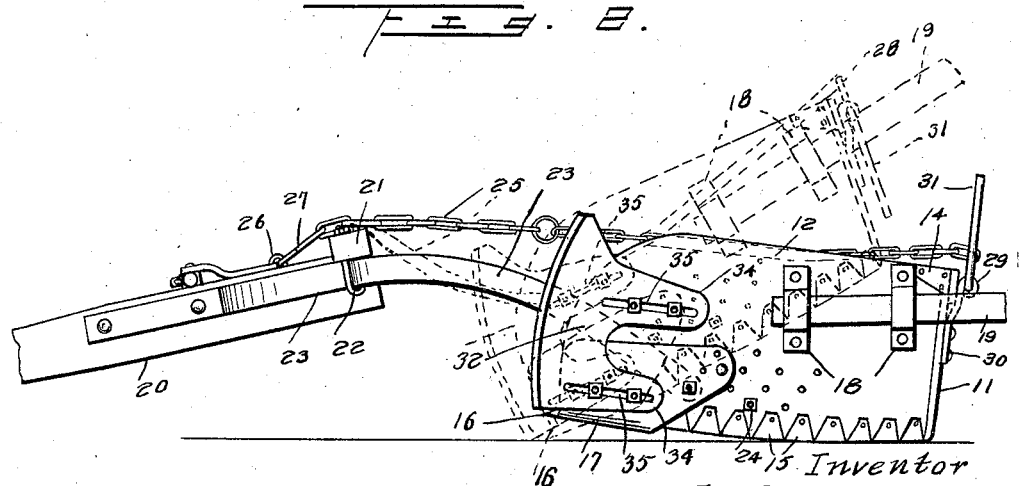
Inventor
J. R. Maginness,
By
Attorney Oct. 16, 1923.　　　　　　　　　　　　　　　　　　1,471,178
　　　　　　　　　　　J. R. MAGINNESS
　　　　　　　　　　　　　　SCRAPER
　　　　　　Original Filed May 7, 1920　　2 Sheets-Sheet 2
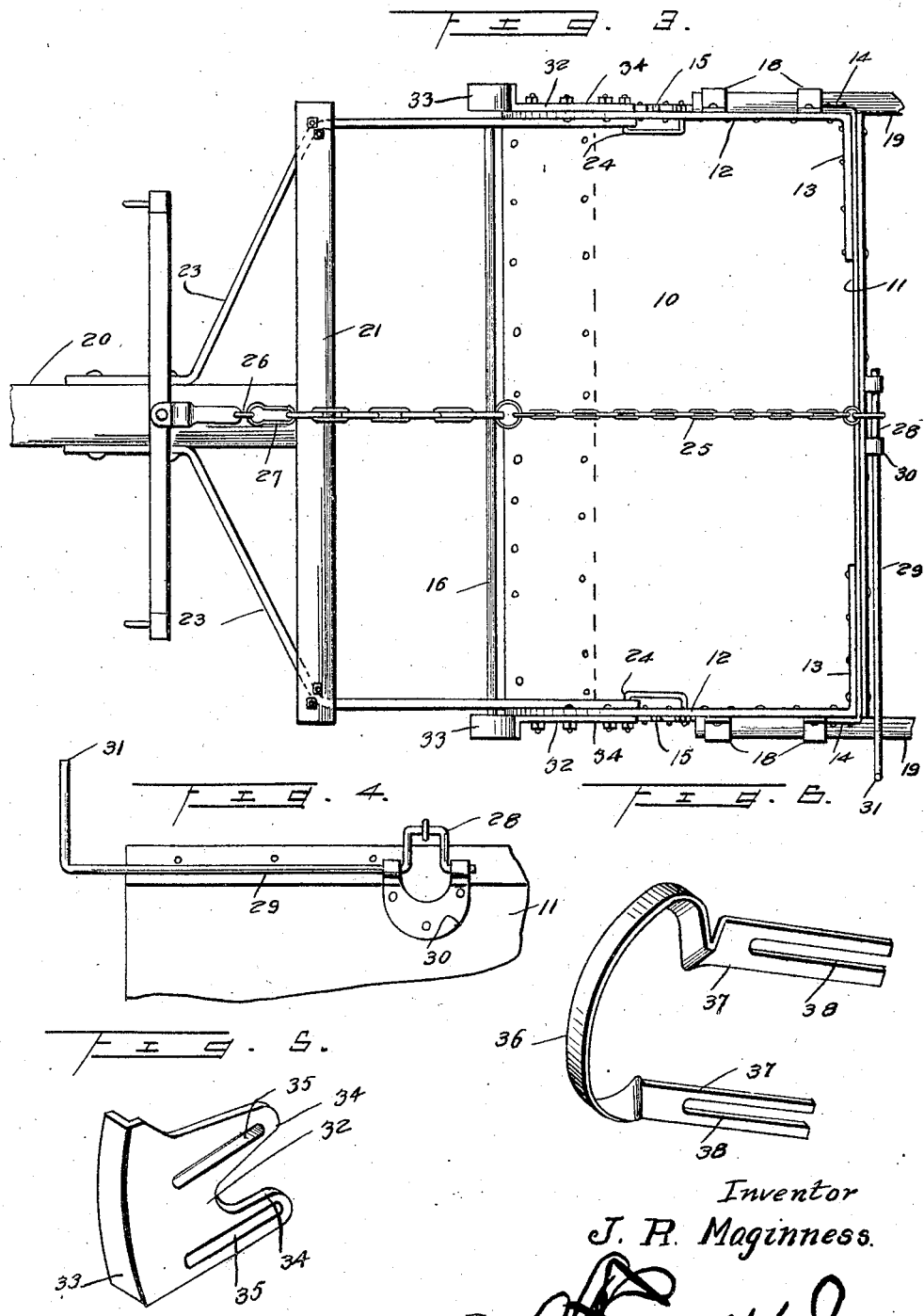

Patented Oct. 16, 1923.

1,471,178

UNITED STATES PATENT OFFICE.

JOSEPH R. MAGINNESS, OF SANDY CITY, UTAH.

SCRAPER.

Application filed May 7, 1920, Serial No. 379,562. Renewed March 27, 1923.

*To all whom it may concern:*

Be it known that I, JOSEPH R. MAGINNESS, a citizen of the United States, residing at Sandy City, in the county of Salt Lake and State of Utah, have invented certain new and useful Improvements in Scrapers; and I do hereby declare the following to be a full, clear, and exact description of the invention, such as will enable others skilled in the art to which it appertains to make and use the same.

This invention relates to an improved scraper for use in excavating work and the principal object of the invention is to provide a scraper so constructed that it may be easily loaded in fine soil or in rocky ground or clay without danger of the operator or draft animals being injured by the pan jumping when striking obstructions and either striking the operator or draft animals and causing injuries which sometimes results in death of the operator and often makes it necessary to kill the draft animals.

Another object of the invention is to so construct this scraper that it may be set to bring the cutting blade at the forward end of the pan into engagement with the ground and a trigger moved to bring the cutting blade out of engagement with the ground when the pan is filled.

Another object of the invention is to so construct this scraper that the pan thereof will be held out of engagement with the ground after it has been dumped and is returning for another load.

Another object of the invention is to so construct this scraper that strain will be removed from the horses' necks.

Another object of the invention is to so construct this scraper that it may do the work of scrapers known as the tongue scraper, the Fresno scraper and the slip or drag scraper, thus making it unnecessary for an excavator to provide a tongue scraper such as shown in Patent No. 158,861 for one type of excavating work and a Fresno scraper such as shown in Patent No. 275,893 for a different type of work. It will thus be seen that this scraper not only saves the operator and draft animals from injury but also saves the contractor the expense and trouble of providing different types of scrapers for different work upon the same job.

This improved scraper is illustrated in the accompanying drawings, wherein:

Figure 1 is a perspective view of the improved scraper.

Figure 2 is a side elevation of the improved scraper, the pan being indicated in a tilted or loading position by dotted lines.

Figure 3 is a top plan view of the improved scraper.

Figure 4 is a fragmentary view looking at the rear wall of the pan to show the construction and mounting of the trigger.

Figure 5 is a perspective view of one of the shoes supporting the pan in an unloaded position.

Figure 6 is a perspective view of a modified form of shoe.

This scraper is provided with a pan having a bottom 10 formed from a strip of heavy sheet metal bent adjacent one end to provide the rear wall 11. This bottom is arcuate longitudinally as shown in Figure 2, thereby permitting the pan to be easily rocked from a filling to a carrying position and from a carrying position to either a filling or to a dumping position. The end walls 12 are also formed of heavy sheet metal and are positioned at the ends of the bottom and carry tongues 13 at their inner ends which are bent to extend along the rear wall to which they are secured by rivets or other permanent fasteners. Tongues 14 extend from the ends of the rear wall and are bent to extend along the end walls to which they are secured by rivets or other permanent fasteners. The end portions of the bottom extend beyond the end walls and are bent upwardly and split thus providing the split flanges or tongues 15 which are secured by rivets or other permanent fasteners to the lower edge portions of the end walls. It will thus be seen that the pan will be formed from heavy sheet metal cut in blanks and bent to assume the proper shape and the blanks then secured by rivets passing through overlapping tongues. A cutting blade 16 extends beneath the forward end portion of the bottom 10 and is provided with arms 17 which extend up the other faces of the side or end walls 12 and are secured thereto by bolts or other releasable fasteners so that when the cutting blade needs to be replaced this can be easily done.

Clips or sockets 18 are secured to the outer faces of the end walls and carry the handles 19 by means of which the pan may be handled or as shown in Figure 1 a single handle 17' is connected to the rear wall and is known in the art as a Johnson bar.

The scraper is provided with a tongue 20 which is supported at its rear end from a cross bar 21 which carries at its end portion depending hanger brackets 22 through which extend the strips forming the hounds 23. These hounds 23 extend forwardly and rearwardly from the hanger brackets and have their forward end portions permanently connected with the tongue and have their rear portions curved downwardly and pivotally connected with the end walls of the pan through the medium of brackets 24. These brackets 24 are adjustably connected with the end walls of the pan by extending through sets of openings formed in the end walls thus permitting the brackets to be adjusted upon the end walls and thus the dumping of the pan controlled. In order to permit the pan to be tilted and retained in a position for filling there has been provided a chain 25 which extends transversely of the pan and longitudinally of the scraper and has its forward end portion releasably connected with the U-bolt 26 by means of a clip 27 which is carried by the U-bolt and will be releasably engaged in one of the end links of the chain. This chain may be constructed of the same size links throughout its length or it may be provided with relatively small links for the greater portion of its length and provided with a number of relatively large links at its forward end portion for engagement by the clip. The rear end of this chain or cable as it may be termed is loosely connected with the crank arm 28 of the trigger shaft 29 mounted in the bearings of the bearing brackets 30 and having a lever or handle extension 31 at its outer end by which the trigger shaft may be rotated from one position to another. When this trigger shaft is turned in one direction, the slack in the cable will be taken up and the pan will be tilted forwardly slightly thus bringing the forward edge of the cutting blade into operative engagement with the ground. When the pan is turned to the dumping position it is desired to retain the scraping blade in spaced relation to the ground and in order to do this, there has been provided shoes which will be positioned upon opposite ends or sides of the pan and may be constructed either as shown in Figure 5 or as shown in Figure 6. In the form shown in Figure 5 and shown in place upon the pan in Figures 1, 2, and 3, the shoes are formed from plates 32 having their outer end portions bent to provide flanges or runners 33 and the inner end portion of said plates are provided with arms 34 having slots 35 which receive bolts or like fasteners on the end walls so said shoes may be easily adjusted.

The form of shoe shown in Figure 6 consists of a strip of resilient metal which is bent intermediate its length to provide an arcuate runner 36 from which extends arms 37 twisted adjacent the ends of the runner so that the arms will fit flatly against the end walls and are provided with slots 38 to receive the fasteners on the side walls so that the shoes may be adjusted in relation to the pan.

When using this scraper, the draft animals will be put in place and the scraper then drawn along the ground to the place where it is to be used. When filling the pan, the trigger shaft will be rotated to draw upon the chain thus causing the pan to be tilted forwardly and bring the forward edge of the digging blade 16 into operative engagement with the ground. The draft animals will be driven forwardly and as they move forwardly the earth will be taken up by the pan. When the pan is filled the trigger shaft will be rotated and returned to its initial position. The pan will then rest upon the curved bottom and the pan can be drawn over the ground without danger of the contents being spilled. By providing this construction, the pan will be self filling and there will be no danger of the operator being struck by a lever or handle if the cutting edge of the blade should strike a rock or other obstruction. There is also no danger of the pan being turned completely over and striking the draft animals and thus causing injury to them which might make it necessary to kill the animals. When the point is reached where the pan is to be dumped, it is only necessary to swing the pan forwardly so that it will turn and rest upon the runners of the shoes. After the pan has been dumped, the scraper will be drawn back to the point of filling and as it passes over the ground the pan will be held in spaced relation to the ground and trash prevented from collecting under the pan. This pan can be used in close corners and in any kind of ground either level or hilly and will very efficiently do the work of the prior patents referred to without danger to men or animals.

What is claimed is:

1. A scraper comprising a pan having side walls and open at its forward end, shoes connected with the side walls, and a draft appliance connected with the side walls, each shoe comprising a plate fitting against the side wall and having its forward portion extending forwardly of the side wall and having a flange extending to one side and curved longitudinally to provide a runner positioned in front of the side wall and vertically curved, the rear portion of the plate being provided with arms extending rearwardly and having longitudinally extending slots formed therein, and fasteners carried by the side walls of the pan and extending through the slots to retain the plate in position.

2. A scraper comprising a pan having a scraping edge along the front edge of its bottom wall, a draft attaching means adjustably connected to the side walls of the pan, a handle connected to the pan, and plates adjustably secured to the side walls of the pan and projecting forwardly of the front edges of said side walls and having their forward edges bent laterally and curved longitudinally to provide dumping runners.

In testimony whereof I affix my signature in presence of two witnesses.

JOSEPH R. MAGINNESS.

Witnesses:
W. W. WILSON,
A. ROBERT LARSON.